United States Patent
Holczer et al.

(10) Patent No.: US 9,197,031 B2
(45) Date of Patent: Nov. 24, 2015

(54) LASER STABILIZATION WITH AN ACTIVELY CONTROLLED FABRY-PEROT RESONANCE CAVITY

(71) Applicant: Karoly Holczer, Los Angeles, CA (US)

(72) Inventors: Karoly Holczer, Los Angeles, CA (US); Emil Kirilov, Innsbruck (AT); John Koulakis, Porter Ranch, CA (US); Michael Stein, Los Angeles, CA (US)

(*) Notice: Subject to any disclaimer, the term of this patent is extended or adjusted under 35 U.S.C. 154(b) by 0 days.

(21) Appl. No.: 14/623,844

(22) Filed: Feb. 17, 2015

(65) Prior Publication Data
US 2015/0263482 A1 Sep. 17, 2015

Related U.S. Application Data

(60) Provisional application No. 61/966,167, filed on Feb. 14, 2014.

(51) Int. Cl.
- H01S 3/10 (2006.01)
- H01S 3/137 (2006.01)
- H01S 3/106 (2006.01)
- H01S 3/13 (2006.01)

(52) U.S. Cl.
CPC ............. *H01S 3/137* (2013.01); *H01S 3/1062* (2013.01); *H01S 3/1304* (2013.01); *H01S 3/1305* (2013.01)

(58) Field of Classification Search
CPC ... H01S 3/08036; H01S 3/105; H01S 3/1062; H01S 3/1304; H01S 3/1305; H01S 3/137; H01S 3/139
See application file for complete search history.

(56) References Cited

U.S. PATENT DOCUMENTS

| | | | |
|---|---|---|---|
| 6,175,579 B1 * | 1/2001 | Sandford et al. | 372/32 |
| 6,516,014 B1 * | 2/2003 | Sellin et al. | 372/32 |
| 7,917,039 B1 * | 3/2011 | Delfyett | 398/182 |
| 2011/0255094 A1 * | 10/2011 | Mohageg et al. | 356/461 |
| 2013/0228688 A1 * | 9/2013 | Plusquellic et al. | 250/339.06 |

* cited by examiner

*Primary Examiner* — Yuanda Zhang
(74) *Attorney, Agent, or Firm* — Law Office of Scott C Harris Inc

(57) ABSTRACT

The invention describes a new method of tuning a Fabry-Perot resonant etalon, whose length is actively controlled through the frequency of an identical length microwave resonant cavity. The length is tunable over a several micron range with the precision and stability of the microwave source frequency.

1 Claim, 4 Drawing Sheets

LASER STABILIZATION WITH AN ACTIVELY CONTROLLED FABRY-PEROT RESONANCE CAVITY

REFERENCES CITED

U.S. PATENT DOCUMENTS

OTHER PUBLICATIONS

Gerlach, G. G. (1946). An Analysis of the Sensing Method of Automatic Frequency Control for Microwave Oscillators. *Proceedings of the I.R.E,* 27, 943-951.
Gerlach, G. G. (1946). A Microwave Relay Communications System. *RCA Review,* 7, 560-600.
Pound, R. V. (1946). Electronic Frequency Stabilization of Microwave Oscillators. *Review of Scientific Instruments,* 17, 490-505.
Tuller, W. G., Galloway, W. C., & Zaffarano, F. P. (1948). Recent Developments in frequency stabilization of microwave oscillators. *Proceedings of the I.R.E.,* 36, 794-800.
Stein, S. R., & Turneaure, J. P. (1972). Superconducting-Cavity-Stabilised Oscillator of High Stability. *Electronics Letters,* 8(13).
Stein, S. R., & Turneaure, J. P. (1973). The Development of the Superconducting Cavity Stabilized Oscillator. *27th Annual Frequency Control Symposium.*
Mann, A. G., & Blair, D. G. (1983). Ultra-low Phase Noise Superconducting-Cavity stabilized microwave oscillator with application to gravitational radiation detection. *Journal of Physics D: Applied Physics,* 16, 105-113.
Komiyama, B. (1987). Experimental Results on a 9.2-GHz Superconducting Cavity Stabilized Oscillator. *IEEE Transactions on Instrumentation and Measurement, Im*-36 (1).
Drever, R. W. (1983). Gravity-Wave Detector Using Optical Cavity Sensing. In E. Schmutzer (Ed.), *Proceedings of the Ninth International Conference on General Relativity and Gravitation* (pp. 265-267). Cambridge University Press.
Drever, R. W., Hall, J. L., Kowalski, F. V., Hough, J., Ford, G. M., Munley, A. J., & Ward, H. (1983). Laser Phase and Frequency Stabilization Using an Optical Resonator. *Applied Physics B,* 31, 97-105.
Black, E. D. (2001). An introduction to Pound-Drever-Hall laser frequency stabilization. *American Journal of Physics,* 69, 79-87.

BACKGROUND OF THE INVENTION

Since its first introduction in the 1940's, R. V. Pound's concept of Automatic Frequency Control, AFC, and its diverse implementations proliferated in all fields of science and technology. An AFC system/circuit matches the frequency of an electromagnetic radiation source, often referred as 'transmitter', to the largest response of a passive device, i.e. to the resonance frequency of resonator, referred as a 'receiver'. This is essential for selective telecommunication, such as FM radio, cell phones, GPS, etc., in everyday life, as well as for radar and laser systems in laboratories. The range of applications is countless, and a myriad of AFC implementations covering the entire electromagnetic spectrum has been developed for divers applications.

In general, an AFC circuit is continuously probing the frequency mismatch between the source and the resonance frequency, introducing time dependent changes—modulations—of the mismatch and selectively detecting the response to these modulations. The resulting signal, proportional to the frequency mismatch, is feed-back to adjust either the source frequency or tune the resonator, thereby minimizing the difference, and completing the AFC basic function: locking together the source and resonator frequency as close as possible for indefinite time, as long as the lock 'holds'.

AFC implementations can be classified in terms of the modulation and the detection schemes used. Either the source frequency (Frequency Modulation, FM) or the resonance frequency of the resonator can be modulated at various depth and frequencies and in general, change in the amplitude or the phase (or both) of resonator response is detected to generate an 'error signal' proportional with the frequency mismatch. Precision of the AFC locking vary depending on the scheme used based on the choice of components available at the different frequencies and applications.

Historically AFC was first developed at microwave frequencies (~10 GHz) for radar applications using resonator-cavities to stabilize the frequency of the microwave sources. Both amplitude and phase detection was implemented, Pound, R. V. (1946), mainly with FM modulation applied to the source. Modulation frequencies much smaller than the typical cavity-resonator frequency-width of a few MHz, as described by, Gerlach, G. G. (1946)., Gerlach, G. G. (1946), Tuller, W. G., Galloway, W. C., & Zaffarano, F. P. (1948) and others.

A different scheme, using modulation frequencies far exceeding the resonator width has been described for very narrow (high quality factor, Q) superconducting resonators by Stein, S. R., & Turneaure, J. P. (1972), Stein, S. R., & Turneaure, J. P. (1973), Mann, A. G., & Blair, D. G. (1983) and Komiyama, B. (1987). Under ambient condition for typical cavities this approach required 10-100 MHz modulation frequencies, difficult to realize, therefore this scheme stayed rearly used at microwave frequencies, but it turned out idealy suited for optical frequencies and gained notority under the name of Pound-Drever-Hall Laser stabilization, PDH.

The optical AFC implementation operates with Lasers—narrow band ('single frequency') light sources—and Fabry-Perot resonators composed of highly reflective pair of mirrors at a distance equal to integer multiple times the light half-wavelength. It has been successfully used for high precision detection of the mirror motion of the resonator (Drever, R. W. (1983)) and it become the most successful Laser stabilization technique (Drever, R. W., Hall, J. L., Kowalski, F. V., Hough, J., Ford, G. M., Munley, A. J., & Ward, H. (1983), and Black, E. D. (2001)) using very high quality factor rigid Fabry-Perot resonators, whose length is kept extremaly stable thanks to the materials used (Zerodur) and enviromental stabilization (temperature control and UHV).

SUMMARY OF THE INVENTION

DESCRIPTION OF THE PREFERRED EMBODIMENTS

Figure 1:
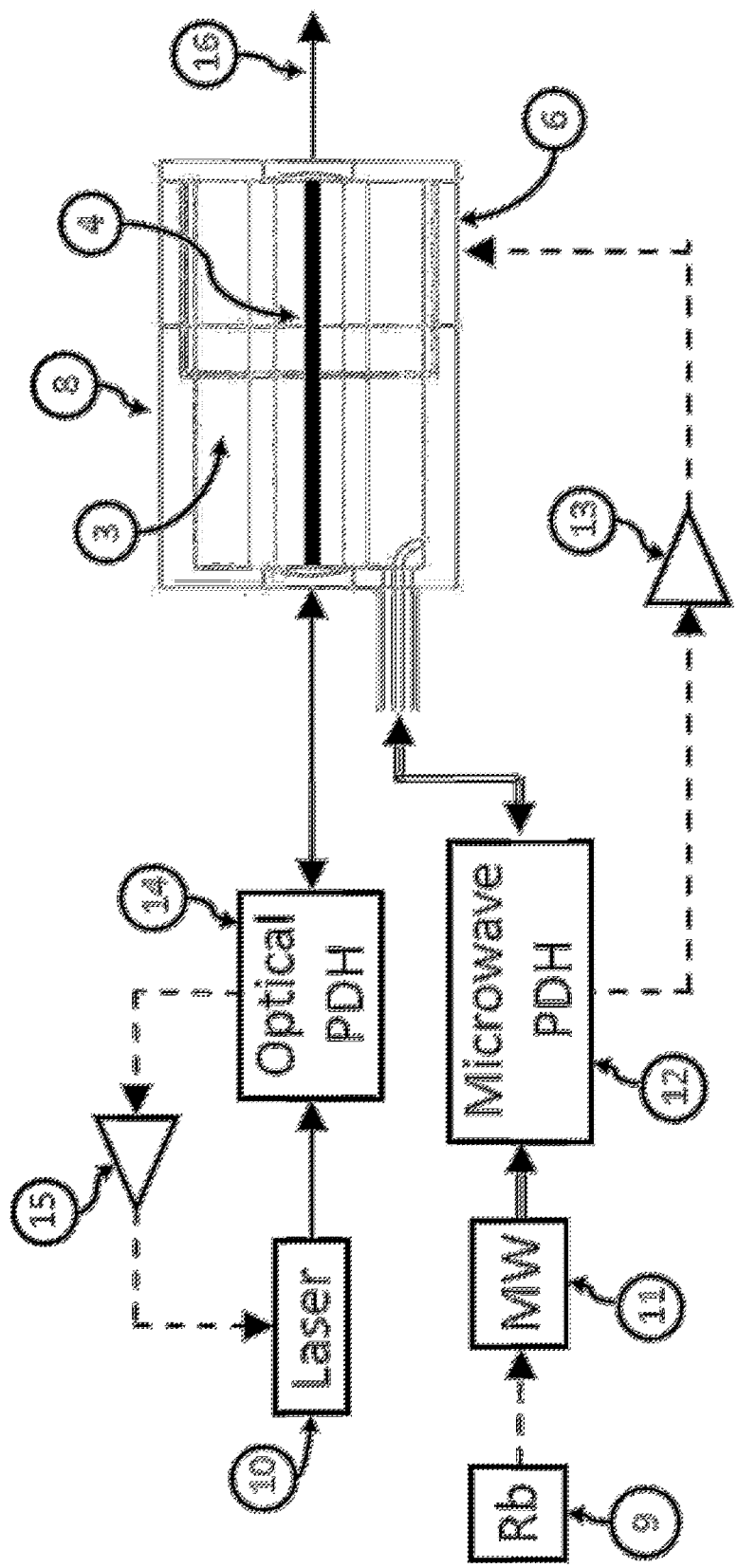
FIG. 1: Block diagram of an apparatus that controls the laser wavelength through the microwave frequency transferring the stability of a reference oscillator to the laser

FIG. 1 shows a block diagram of an embodiment of the present invention, a split coaxial cavity resonator 8 which includes a microwave resonant cavity 3 and a coplanar Fabry-Perot resonant etalon 4 the resonator 8 having a gap (5 in FIG. 2) around its center allowing both lengths of the microwave resonant cavity 3 and the coplanar Fabry-Perot resonant etalon 4 to be simultaneously expanded or contracted over several microns using a piezoelectric actuator 6. The simultaneous expansion or contraction of the microwave resonant cavity 3 and the coplanar Fabry-Perot resonant etalon 4 in turn permits stabilization and control of the frequency of microwave source 11 and the wavelength of the light output by laser 10.

In order to serve as a device that stabilizes and controls the frequency of microwave source 11 and the wavelength of the light output by laser 10, the split coaxial cavity resonator 8 must provide two parallel reference planes, co-planar with the optical mirrors (1 and 2 in FIG. 2) forming the Fabry-Perot resonant etalon 4, whose separation defines the length to be stabilized. Other dimensions of the resonator 8 should not influence its resonant frequency. However in general the resonant frequency of a microwave cavity does depend on its dimensions in all three directions. The exceptions to this generality are the transverse electric and magnetic modes of a coaxial cavity. When the dimensions of a coaxial cavity are chosen so that the lowest-frequency resonant mode is the mode-of-interest, and the frequencies of undesired modes are well above the intended working frequency, only one resonant mode will be present in the operation of such a coaxial cavity, the one whose frequency depends only on its length. An example of such a coaxial cavity is one that operates at 2.5 GHz, is 60 mm long and has an inner and outer diameter of 15 mm and 30 mm respectively. Furthermore it is desirable that the coaxial cavity be constructed of high-conductivity metal in order to maximize its Q factor and optimize the precision of the frequency locking.

Figure 2:
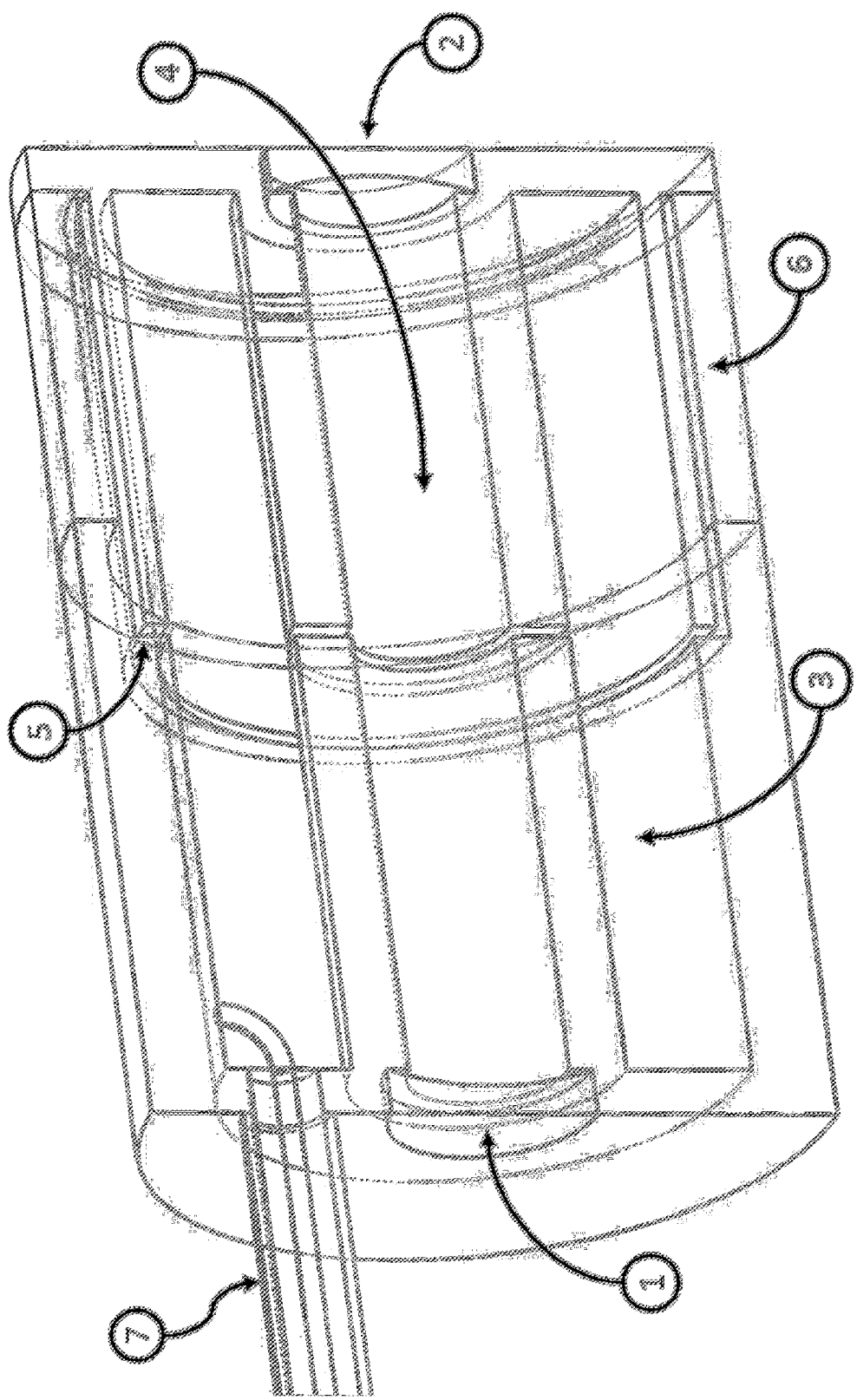
FIG. 2: Exploded view of a split coaxial cavity resonator, with microwave resonant cavity and coplanar Fabry-Perot resonant etalon.

FIG. 2 provides an exploded view of the split coaxial cavity resonator 8. As shown a microwave resonant cavity 3 is formed by the inner and outer metal cylinders and a Fabry-Perot resonant etalon 4, which includes high-quality reflective mirrors 1 and 2 set coplanar with the parallel reference planes (end-walls) whose separation defines the width of the resonator 8, is contained within the microwave resonant cavity 3. A microwave source (11 in FIG. 1) is coupled to the microwave resonant cavity 3 through an input 7, which may be an iris joining a waveguide to the cavity or via a loop of wire entering the cavity. It is important that the coupling be near critical, and that the effect of the coupling structure on the resonant frequency of the cavity should be minimal. Reflective mirror 1 of the Fabry-Perot etalon 4 provides ingress to the etalon and reflective mirror 2 of the etalon provides egress.

Returning to FIG. 1, the embodiment of the present invention shown there includes two automatic frequency control loops, one a microwave automatic frequency control loop which includes the microwave resonant cavity 3 and a microwave source 11 which generates the signal fed into the microwave resonant cavity 3, and the other loop an optical automatic frequency control loop which includes the Fabry-Perot resonant etalon 4 and a laser source 10 which generates the signal fed into the Fabry-Perot resonant etalon 4. The two loops are interconnected by the identical mechanical length of the Fabry-Perot resonant etalon 4 and the microwave resonant cavity 3, neither length being changeable without the other length being simultaneously changed in the identical amount.

The frequency of the microwave source 11 included in the first loop lies within the frequency range set by the length range of the microwave resonant cavity 3. The stability of the microwave source 11 is determined by its being phase-locked to a reference 9. The reference 9 may be a Rubidium clock or similar device known to practitioners of the art. The long term stability (Allan variance) Rubidium clock is of the order of $2 \times 10^{-12}$ over 100 seconds.

Microwave sources are routinely locked to commercially available, stable-frequency reference oscillators providing better than $10^{-11}$ Allan variance over several second timescales (see, for example, SRS PRS10 Rubidium Frequency Standard). Some of these references can also be locked to other time standards with better longer term stability (such as the GPS timing signal) to improve their stability over several days and years. With proper microwave resonant cavity design, this frequency stability can be transformed to a length stability locking the cavity frequency to the microwave source, for example by using the microwave PDH lock discussed below.

The first automatic frequency control loop, the microwave automatic frequency control loop, is completed with a microwave PDH lock circuit 12. The microwave PDH lock circuit 12, detailed below, generates an error signal that is proportional to the frequency difference between the stabilized frequency signal of the source 11 and the resonant frequency of signal in the microwave resonant cavity 3. The error signal is fed back via a servo 13 to the piezoelectric actuator 6, which adjusts the microwave resonant cavity 3 length so that the resonant frequency of the signal in the cavity 3 matches the frequency of the stabilized frequency source 11. In this way, the length of the microwave resonant cavity 3 of the split coaxial cavity resonator 8 is actively stabilized, and as a consequence so is the length of the Fabry-Perot resonant etalon 4 stabilized.

The other loop included in the embodiment of the invention shown in FIG. 1 is an optical automatic frequency control loop which includes the Fabry-Perot resonant etalon 4 and a laser source 10 which generates the signal fed into the Fabry-Perot resonant etalon 4. The final step in completing the device of FIG. 1 is to lock the output from the laser to the Fabry-Perot resonant etalon. The output of the laser 10 goes to a standard optical PDH 14 and from there to the Fabry-Perot etalon 4 within the split coaxial cavity resonator 8. The optical PDH 14 generates an error signal that is fed back through a second servo 15 to the laser 10, keeping the frequency of its output locked to one of the resonant modes of the Fabry-Perot etalon 4. Thus, the output of the laser 10, as well as the light 16 transmitted through the Fabry-Perot etalon 4 has inherited the stability of the reference 9 because the length of one of the resonant modes of the Fabry-Perot etalon 4 has previously been controlled through the use of the piezoelectric actuator to stabilize the length of the microwave resonant cavity 3 of the split coaxial cavity resonator 8.

To achieve a stable frequency-to-distance conversion with the device depicted FIG. 1, environmental effects on the split coaxial cavity resonator 8 must be minimized. For example, if the refraction index of the material within the cavity changes, it will influence the frequency/distance and wavelength/distance relationships. Changes in temperature also have an effect, through the temperature coefficient of the cavity wall resistivity or through changes in the coupling. The most stable cavities require both temperature control and a vacuum environment.

Laser stabilities on the order of $2\times10^{-12}$ over 100 seconds can be achieved with the device depicted FIG. 1. In addition, the device is very flexible. Changing the frequency of the microwave source 11 allows the split coaxial cavity resonator 8 length to be varied over several microns, and thus permits continuous tuning of the light wavelength, as opposed to being restricted to half-wavelength multiples.

Different variants of optical and microwave AFC circuits can be used to realize the invention described. A preferred embodiment of the microwave AFC uses the microwave analog of the PDH lock, 12 of FIG. 1, utilizing modern digital components developed for the cell phones as presented in FIG. 3. A preferred embodiment of the optical AFC uses the optical analog of the PDH lock, 14 of FIG. 1, utilizing serrodyne modulation as shown in FIG. 4.

Figure 3:
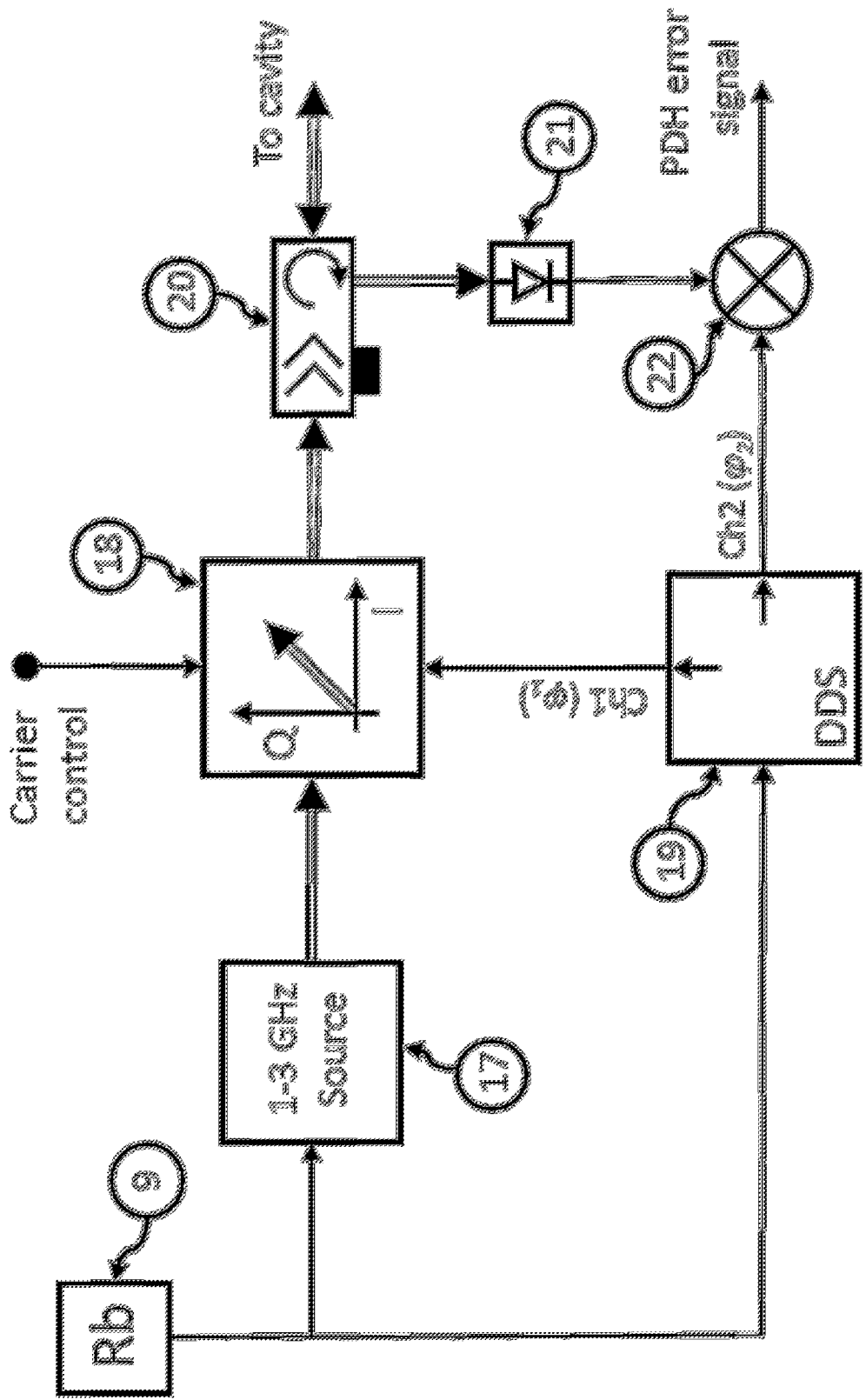
FIG. 3: Block diagram of a digital microwave Pound-Drever-Hall lock.
Figure 4:
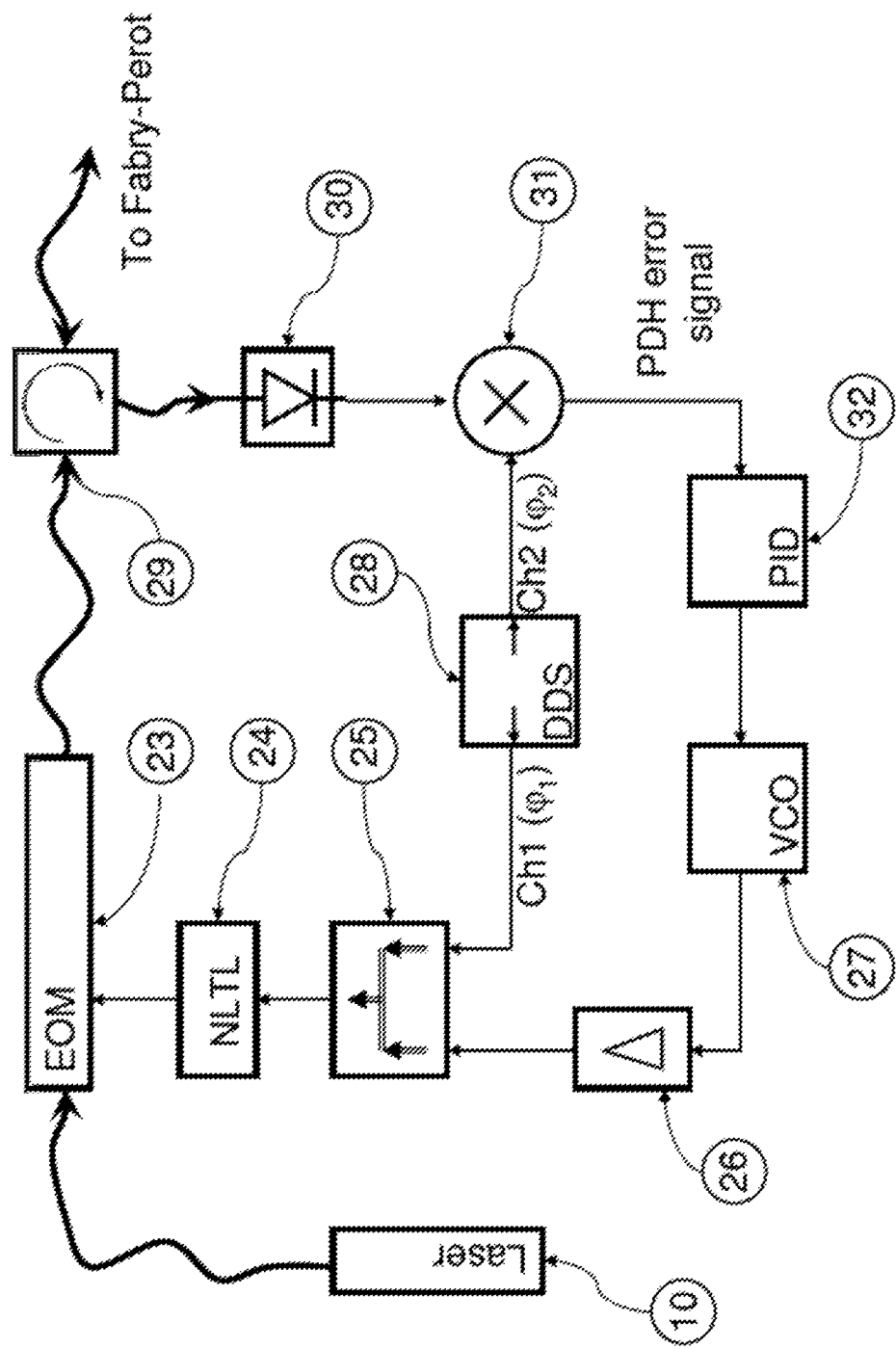
FIG. 4: Block diagram of a preferred embodiment for an optical automatic frequency control employing a serrodyne modulation of light.

The microwave AFC novelty and strength is in the use of available functionally relevant digital-microwave components as shown on FIG. 3. Parts such as amplifiers, attenuators, isolators, filters etc., whose purpose is only analog signal conditioning are not shown, but are assumed to be there as needed.

All signal sources are phase-locked to a high precision reference clock, e.g., a 10 MHz Rubidium clock 9, in FIG. 1, assuring 11 digit absolute precision, or better. The long-term stability (Allan variance) of the Rubidium clock is of the order of $2\times10^{-12}$ over 100 seconds.

The microwave signal source is a low phase-noise voltage controlled oscillator, 17 in FIG. 3, whose 20-50 MHz tuning range covers the resonant cavity, 3 in FIG. 2, operating in the 1-3 GHz frequency range. Using a direct digital synthesizer (DDS) and digital phase locked loop (PLL) integrated in a single chip, such as Analog Devices models AD9540 or AD9956, the resulting VCO, 17 of FIG. 3, is phase-locked to the reference clock 9 and with other circuit components forms a digitally programmable microwave source, whose frequency can be set through a standard USB interface with 48 bit precision and stable to less than 100 MHz For frequency modulation of the microwave output of 17 of FIG. 3, a vector modulator 18 such as Analog Devices models AD8340 or AD5373 is used. The vector modulator 18 is configured to preserve both side bands and the carrier, with their phase and amplitudes adjusted to generate the optimum error signal.

The modulation signal of frequency $f_1$ generated by one of the channels of the dual channel direct digital synthesizer, 19 of FIG. 3, such as Analog Devices model AD9958, whose clock is locked to the Rubidium clock 9, is used to generate (with 32 bit resolution) on both outputs, with independently adjustable phase (14 bit/0.02° resolution) and amplitude (10 bit resolution). The first output of the DDS drives the vector modulator 18.

A four-port circulator, 20 of FIG. 3, directs the modulated microwave to the resonant cavity, 3 in FIG. 2, and the back-reflected signal to a broad-band, high-bandwidth detector diode 21 of FIG. 3. The signal-of-interest is carried in the output of this diode at frequency $f_1$. It is filtered and connected to the RF input of the mixer 22 whose local oscillator input is connected to the second channel of the DDS 19. The programmable phase offset between the DDS channels allows phase adjustment for optimal detection of the $f_1$ component. The low-pass filtered IF output of the mixer is the PDH lock error signal, which is brought after appropriate gain to the piezoelectric actuator, 6 of FIG. 2, to change the gap in the center of the microwave resonant cavity move in motion of one half of the split cavity, 3 of FIG. 2.

FIG. 4 is a block diagram of a preferred embodiment for an optical automatic frequency control employing a serrodyne modulation of light, enabling fast frequency correction over an 800 MHz range independent of the laser used. Light from the laser, 10 of FIG. 1, is launched into a fiber electro-optical phase modulator, 23 of FIG. 4, driven by a non-linear transmission line 24, operating in the 600-1400 MHz range, which converts the sinewave signal of the VCO 27 into a sawtooth wave. The VCO signal is then amplified 26 until the amplitude of the sawtooth becomes equal to the voltage required by the electro-optical phase modulator 23 for a phase change of $\pi$ (3-4 volts) and serrodyne modulation is realized, separating most of the light intensity (~70%) in the upper or lower sideband 600-1400 MHz away from the carrier. This sideband, which carries most of the laser power, can now be tuned with a band-width limited only by the band-width of the VCO 27 over a range of ~800 MHz, allowing for an extremely fast PDH lock, i.e. a very good stabilization for the laser wavelength.

To create the necessary side bands for the PDH lock a $f_1$ signal ~30-50 MHz generated by DDS 28 of FIG. 4, is added 25 to the amplified signal of the VCO 27 before the NLTL 24. The output light from the electro-optical phase modulator 23 is coupled into the Fabry-Perot cavity 4 of FIG. 2, either through a fiber-circulator 29 or a beam-splitter, if free space optics is used, and the back reflected signal is brought to a photodiode 30. The $f_1$ frequency component of the signal is detected with the help of an independently adjustable phase channel of the DDS 28, by a Mixer 31. The resulting PDH error signal, after proper amplification, serves as the control signal for the VCO 27 to complete the optical laser lock of the FIG. 4 device.

The described preferred embodiment of the microwave PDH frequency control is enabled by recent developed cell phone components, the optical PDH is the same concept and the traditional realization at optical frequencies.

Having both AFC loops locked the laser long term stability is determined by the stability of the Rubidium clock, shorter time scale time scale stability determined by the optical and mechanical quality of the Fabry-Perot resonator.

Opening the optical AFC loop and recording the PDH error signal as a function microwave frequency, i.e. as a function of the resonator length, allows sub-picometer precision measurement of the light wavelength couple to the Fabry-Perot cavity.

The invention described is also a wave meter capable of measuring the absolute wavelength of the light coupled into it with better than picometer precision. Opening the optical AFC loop and recording the PDH error signal as a function of microwave frequency, i.e. as a function of the resonator length multiple half-wavelengths, zero-crossing will be detected allowing sub-picometer precision determination of the light wavelength.

Although only a few embodiments have been disclosed in detail above, other embodiments are possible and the inventors intend these to be encompassed within this specification. The specification describes specific examples to accomplish a more general goal that may be accomplished in another way. This disclosure is intended to be exemplary, and the claims are intended to cover any modification or alternative which might be predictable to a person having ordinary skill in the art. For example, other devices, and forms of modularity, can be used.

Also, the inventors intend that only those claims which use the words "means for" are intended to be interpreted under 35 USC 112, sixth paragraph. Moreover, no limitations from the specification are intended to be read into any claims, unless those limitations are expressly included in the claims. The computers described herein may be any kind of computer, either general purpose, or some specific purpose computer such as a workstation. The computer may be a Pentium class computer, running Windows XP or Linux, or may be a Macintosh computer. The computer may also be a handheld computer, such as a PDA, cellphone, or laptop.

The programs may be written in C, or Java, Brew or any other programming language. The programs may be resident on a storage medium, e.g., magnetic or optical, e.g. the computer hard drive, a removable disk or media such as a memory stick or SD media, or other removable medium. The programs may also be run over a network, for example, with a server or other machine sending signals to the local machine, which allows the local machine to carry out the operations described herein.

What is claimed is:

1. A method of using a split coaxial cavity resonator which includes a microwave resonant cavity and a coplanar Fabry-Perot resonant etalon in the center of the cavity, said resonator having a gap around its center allowing the lengths of the microwave resonant cavity and the coplanar Fabry-Perot resonant etalon to be simultaneously expanded or contracted using a piezoelectric actuator, comprising:

a microwave automatic frequency control loop including the microwave resonant cavity and a stabilized frequency source which generates the signal fed into said microwave resonant cavity, said stabilized frequency source being phase-locked to a rubidium clock or similar reference which determines the stability of said stabilized frequency source;

an optical automatic frequency control loop including the Fabry-Perot resonant etalon and a laser source which generates the signal fed into said Fabry-Perot resonant etalon;

a microwave Pound-Drever-Hall lock which generates an error signal proportional to the frequency difference between the stabilized frequency source of said microwave automatic frequency control loop and the resonant frequency of the signal in the microwave resonant cavity, said error signal being fed back to the piezoelectric actuator that allows the lengths of the microwave resonant cavity and the coplanar Fabry-Perot resonant etalon to be simultaneously expanded or contracted so that the resonant frequency of the signal in the microwave resonant cavity matches the frequency of the stabilized frequency source of said microwave automatic frequency control loop;

a standard optical Pound-Drever-Hall lock which generates an error signal proportional to the frequency difference between the frequency of the laser source of said optical automatic frequency control loop and one of the resonant frequencies of the Fabry-Perot resonant etalon, said error signal being fed back to said laser source so that the frequency of the laser is locked to one of the resonant modes of the Fabry-Perot resonant etalon, the length of which had previously controlled by the use of the piezoelectric actuator.

* * * * *